US012754526B2

(12) United States Patent
Kopetz

(10) Patent No.: US 12,754,526 B2
(45) Date of Patent: Oct. 6, 2026

(54) CONTROL SYSTEM AND METHOD FOR SAFE CONTROL OF A TECHNICAL SYSTEM

(71) Applicant: TTTech Computertechnik Aktiengesellschaft, Vienna (AT)

(72) Inventor: Hermann Kopetz, Krumpendorf (AT)

(73) Assignee: TTTech Computertechnik Aktiengesellschaft, Vienna (AT)

( * ) Notice: Subject to any disclaimer, the term of this patent is extended or adjusted under 35 U.S.C. 154(b) by 320 days.

(21) Appl. No.: 18/611,973

(22) Filed: Mar. 21, 2024

(65) Prior Publication Data

US 2024/0361740 A1 Oct. 31, 2024

(30) Foreign Application Priority Data

Apr. 25, 2023 (EP) .................................... 23169863

(51) Int. Cl.
*G05B 19/042* (2006.01)

(52) U.S. Cl.
CPC .................... *G05B 19/0428* (2013.01); *G05B 2219/24024* (2013.01)

(58) Field of Classification Search
CPC ...... G05B 19/0428; G05B 2219/24024; G05B 9/03; G05B 2219/33144; G05B 19/4063; B25J 9/1674
See application file for complete search history.

(56) References Cited

U.S. PATENT DOCUMENTS

2004/0140785 A1 7/2004 Szulyk
2010/0217434 A1 8/2010 Hellberg et al.
2014/0081473 A1* 3/2014 Bengtson .................. F03D 7/00 700/287
2014/0277608 A1* 9/2014 Debouk ................... G05B 9/03 700/79
2016/0009235 A1* 1/2016 Joyce .................. B60R 16/0232 701/24
2016/0103450 A1* 4/2016 Hogenmueller ..... G05D 1/0077 701/23
2016/0380858 A1 12/2016 Poledna et al.
(Continued)

FOREIGN PATENT DOCUMENTS

EP 3557356 A1 * 10/2019 ......... G05B 23/0291

OTHER PUBLICATIONS

Extended European Search Report Issued in European Patent Application No. 23169863.0 dated Oct. 13, 2023 (6 Pages).

*Primary Examiner* — Kenneth M Lo
*Assistant Examiner* — Mohammed Shafayet
(74) *Attorney, Agent, or Firm* — Eversheds Sutherland (US) LLP

(57) ABSTRACT

The invention is located in the field of computer technology and relates to a subsystem, the decision system, of a distributed fault-tolerant computer architecture for fully autonomous control of a technical system. This control system consists of four subsystems, each of which is an independent hardware/software system and where each of the four subsystems forms a fault-containment unit. The four independent subsystems of the described architecture are a Primary Control System, a Monitoring System (MS), a Fallback System and a Decision System. The present invention ensures even in the event of a fail-silent fault of the decision system, the system is brought to a safe state.

15 Claims, 2 Drawing Sheets

(56) References Cited

U.S. PATENT DOCUMENTS

| | | | | |
|---|---|---|---|---|
| 2017/0139411 | A1* | 5/2017 | Hartung | G05D 1/87 |
| 2019/0243363 | A1* | 8/2019 | Kim | B60W 50/023 |
| 2022/0236762 | A1 | 7/2022 | Kopetz | |
| 2023/0011677 | A1* | 1/2023 | Li | H04L 69/40 |

* cited by examiner

CONTROL SYSTEM AND METHOD FOR SAFE CONTROL OF A TECHNICAL SYSTEM

CROSS-REFERENCE TO RELATED APPLICATIONS

This application claims priority to and the benefit of EP application Ser. No. 23/169,863.0, filed Apr. 25, 2023, which is hereby incorporated by reference herein in its entirety.

TECHNICAL FIELD

The invention relates to a control system for the safe control of a technical system and to a method for performing control with such a control system, wherein the control system comprises four independent computer subsystems, a primary control system, PCS, a monitoring system, MS, a fallback system, FBS, and a decision system, DS, wherein the PCS calculates setpoint values for the control of the technical system in each time slice and sends the setpoint values in each case in a message to the MS and the DS before the end of the time slice, and wherein the MS checks the setpoint values it has received from the PCS in each time slice and transmits the result of this check—TRUE or FALSE—in a message to the DS before the end of the time slice, and wherein the FBS calculates setpoint values in each time slice, which can bring the system from a current state into a safe state, and wherein the FBS sends these setpoint values in a message to the DS, and wherein the DS receives a message from each of the PCS, the MS and the FBS in each time slice and, on the basis of the result of the check by the MS, decides whether it is the setpoint values of the PCS or the FBS, the so-called "selected" setpoint values, that are sent to the actuators, and wherein the actuators are intelligent actuators, IA, which have a first input channel and a second input channel.

The invention is located in the field of computer technology and relates to a control system for, in particular fully autonomous, control of a technical system.

BACKGROUND

The safe, fully autonomous control of a technical system (e.g. a machine, a robot or a vehicle) requires a control system in the form of a distributed fault-tolerant real-time computer system consisting of a number of subsystems, which autonomously controls the system under the given conditions and also brings the system into a safe state in the event of a failure of a subsystem.

A possible architecture of such a distributed fault-tolerant control system was published by H. Kopetz in the *Springer Lecture Notes on Computer Science* (*LNCS*) Vol. 13660, Chapter 4, pp. 61-84 under the title *An Architecture for Safe Driving Automation* in December 2022 [Kop22]. This safe control system consists of four subsystems, each of which is an independent hardware/software system and where each of the four subsystems forms a fault-containment unit.

A Fault Containment Unit (FCU) is an independent, closed subsystem that communicates with its environment by exchanging messages. An internal fault of an FCU, whether caused by software, hardware or intrusion, is manifested in the absence or falsification of a correct message.

In the architecture described [Kop22], the advancement of time is modelled by a sequence of time slices. At the beginning of each time slice, a subsystem observes its environment. Throughout the duration of a time slice, a subsystem calculates new setpoint values for the actuators. Before the end of each time slice, a subsystem outputs the newly calculated setpoint values to its environment in the form of messages. The "environment" of a subsystem comprises all subsystems that receive messages from the given subsystem or send messages to the given subsystem.

The four independent subsystems of the described architecture are a Primary Control System (PCS), a Monitoring System (MS), a Fallback System (FBS), and a Decision System (DS).

These four independent subsystems are connected to communication channels via which periodic time-controlled messages can be exchanged. A prerequisite for the exchange of time-controlled messages is the availability of a reliable global time base.

The independent Primary Control System (PCS), equipped with sensors, controls the technical system under normal conditions and calculates a set of setpoint values in each time slice that determine the future intended behaviour of the system according to specifications. The current setpoint values are sent in a message to the monitoring system (MS) and the decision system (DS) before the end of a time slice. The normal conditions must be precisely specified in the specification of the control system.

The independent monitoring system (MS), equipped with sensors, checks the setpoint values it has received from the PCS in each time slice. The result of the check—TRUE or FALSE—is sent in a message to the decision system (DS) before the end of a time slice.

The independent fallback system (FBS) uses its sensors to observe the behaviour of the technical system in its environment and calculates a set of setpoint values in each time slice that brings the system from its present state to a safe state, and sends these setpoint values in a message to the decision system (DS). In reality, anomalous conditions may occur that are not covered by the primary control system (PCS) specification. The FBS system must attempt to bring the system into a safe state even under these abnormal conditions.

The independent decision system (DS) receives one message each from the PCS, the MS and the FBS in each time slice and, on the basis of the evaluation of the MS, decides whether the output data of the PCS or the FBS will be sent to the actuators.

Assuming that the decision system (DS) does not make an error, this control system described in [Kop22, pp. 61-84] tolerates a single random fault of the PCS, MS or FBS and brings the system to a safe state in the event of a fault.

SUMMARY

It is an object of the invention to provide a solution with which in a control system described above it can be ensured that, even in the event of a fail-silent fault of the decision system (DS), the system is brought to a safe state.

This object is achieved by the fact that, if the DS is fault-free, the DS sends the selected setpoint values in a time-controlled message to the first input channel of the IA at an a priori determined periodic first time point in each time slice, and wherein the DS has a fail-silent behaviour, so that no message is sent to the IA if an fault occurs in the DS, and wherein the FBS is configured to send its calculated setpoint values in a time-controlled message at an a priori determined periodic second timepoint_2 to the second input channel of the IA in each time slice, and wherein in each time slice the second timepoint_2 occurs before the first timepoint_1, and wherein after the first timepoint_1 the IA checks whether a message sent by the DS has been received in the current time slice, and wherein if this is the case, the IA directs the setpoint values contained in the message sent by the DS and received by the IA to the system, and if this is not the case, the IA directs the setpoint values contained in the message sent by the FBS to the second input channel of the IA to the system, and the IA continues to transmit the setpoint values received from the FBS via the second receive channel to the system in all subsequent time slices until the control system is reinitialized.

According to the invention, it is assumed that the decision system (DS) does not output a message in the event of a DS fault—i.e. the DS shows a fail-silent behaviour. This fail-silent behaviour of the DS is achieved as follows: the software of the DS is simple, so that the software of the DS can be formally specified, the correctness of the software can be formally verified and a software error can thus be excluded. The software of the DS is executed on a fault-detecting processor, such as those available on the market (e.g. Infineon AURIX: https://en.wikipedia.org/wiki/Infineon_AURIX), so that a hardware fault is detected by the hardware and, in the event of a hardware fault, the DS system is switched off, thus preventing the output of a message from the DS and thus implementing the fail-silent behaviour.

According to the invention, the decision system (DS) normally sends the selected setpoint values in a time-controlled message to an intelligent actuator. The intelligent actuator has two independent input channels for messages, a first channel for messages from the DS and a second channel for messages from the FBS.

Highly reliable intelligent actuators with two independent input channels are the state of the art in driver assistance systems. In a driver assistance system, an intelligent actuator must have a first input channel for the setpoint values of the assistance system and a second input channel for the setpoint values of the driver. The intelligent actuator decides which setpoint values are to be forwarded to the system based on given criteria.

According to the invention, the intelligent actuator in the present architecture decides as follows:

(i) If there is no current message from the DS on the first channel immediately after the a priori known time point of the planned arrival of the time-controlled message from the DS, the intelligent actuator accepts the setpoint value of the current message that was received on the second channel from the FBS.

(ii) In the future (after the initial acceptance of the setpoint values from the FBS), the intelligent actuator will accept the setpoint values that arrive periodically from the FBS, until the system has reached a safe state.

The invention thus ensures that in the event of a fail-silent failure of the decision system (DS), the system is brought to a safe state.

Advantageous embodiments of the control system and the method are described in the dependent claims.

It may be provided that the MS generates a model of the system and its environment and, on the basis of this model, checks whether the setpoint values received from the PCS ensure a safe behaviour of the system, and if safe behaviour is ensured, as a result of checking the message it sends the value TRUE in the message to the DS and otherwise sends the value FALSE.

Preferably, it is provided that the control system is reinitialized after the system has reached a safe state.

Advantageously, the MS consists of two subsystems, a calculation system and a verification system, wherein the totality of these two subsystems forms a single fault-containment unit.

Preferably, it can be provided that in the MS the calculation phase of the subsequent time slice is carried out in parallel with the verification phase of the present time slice.

It is advantageously provided that, if the message from the MS to the DS contains the value FALSE, if the DS is fault-free, in its message to the first input channel of the IA the DS transmits the setpoint values received from the FBS as selected setpoint values, and wherein the DS continues to send the setpoint values of the FBS to the first receive channel of the IA in all subsequent time slices, until the control system or the DS is reinitialized.

Furthermore, it can preferably be provided that in a time slice the MS receives the setpoint values calculated by the PCS in a message, further receives in a message from the DS the setpoint values sent by the PCS in a message to the DS, and the MS sends a message to the DS, the content of which is set to FALSE if the content of the message from the DS differs from the content of the message from the PCS.

It is advantageously provided that the DS comprises a simple software and a fault-detecting processor on which the simple software for calculating the setpoint values is executed.

DEFINITIONS

The following sets out the meaning of important terms used in the description.

Abnormal conditions: Conditions of the system or in the environment of the system that may lead to unsafe behaviour of the system, but which are not included in the specification of the installation.

Calculation phase: The first periodic phase of a time slice during which the primary control system (PCS) and the fallback system (FBS) calculate their setpoint values, and during which the monitoring system (MS) builds a model of the system and its environment on the basis of the sensor system of the monitoring system (MS).

Calculation system: A subsystem of the monitoring system which is active in the calculation phase.

Decision Systems (DS): A subsystem of the control system that forms a fault containment unit (FCU) and decides in each time slice whether the setpoint values of the primary control system (PCS) or the fallback system (FBS) are transferred to the intelligent actuator (IA)

Input channel: A communication channel of an intelligent actuator for receiving messages Reception time (EZ): The time at which the reception of a message is completed.

Fail-silent computer: A computer that is able to detect a fault that has occurred and, in the event of a fault, prevents any output. A fail-silent computer produces either correct output or no output.

Fallback system (FBS): A subsystem of the control system, which is designed as an FCU and which brings the behaviour of a technical system from the current (possibly safety-critical) state to a safe state.

Fault Containment Unit (FCU): An independent, closed subsystem that communicates with its environment by exchanging messages. An internal fault of an FCU, whether triggered by software, hardware or intrusion, is manifested in the absence or falsification of an expected message.

Intelligent actuator: An actuator is a piece of technical hardware that translates a digital setpoint value into an action in physical reality. An intelligent actuator has two input channels for different setpoint values and decides on the basis of a priori specified criteria which setpoint values are to be applied in the given situation.

Monitoring system (MS): A subsystem of the control system that forms a fault containment unit (FCU) and in each calculation phase of a time slice computes a model of the system and its environment on the basis of its sensor data, and which, in the verification phase of a time slice, determines whether the setpoint values received from the primary control system (PCS) lead to a safe behaviour of the system under the given conditions.

Normal conditions: Conditions for the safe behaviour of a system that are specified precisely in the system specification.

Primary Control System (PCS): A control system which, under normal conditions, calculates the setpoint values for the behaviour of the technical system, in particular the mechanical system of the technical system, in accordance with an existing specification.

Sending time (SZ): The time point at which the transmission process of a message begins.

Safe state: State of a system in which the risk of undesirable behaviour of the system is excluded.

Situation variable: State variable in the decision system (DS) and in the intelligent actuator (IA) that indicates whether the entire system is in a normal or abnormal state.

Setpoint value: Digital specification of a value for an actuator that produces an effect in physical reality.

Control system: The highly reliable, distributed computer system that controls the mechanical part of a system.

Technical system: A technical system (e.g. a machine, a robot or a vehicle) consists of a mechanical system and a control system that determines the behaviour of the mechanical system.

Verification phase: The second periodic phase of a time slice, during which the MS checks the setpoint values received from the primary control system (PCS), the DS takes the decision as to which setpoint values are passed to the intelligent actuator (IA) and the intelligent actuator (IA) decides whether the setpoint values received on the first channel or on the second channel are used.

Verification system: A subsystem of the monitoring system which is active in the verification phase.

Time-controlled message: A message, the periodic sending and reception times of which have been defined a priori (in the system design) of the control system.

Time slice: A periodic interval on the time axis, which is divided into a calculation phase and a verification phase. The verification phase of the current time slice can be performed in parallel with the calculation phase of the following time slice.

BRIEF DESCRIPTION OF THE DRAWINGS

In the following, the invention is described in more detail in the figures by means of a non-limiting exemplary embodiment. In the drawing

DETAILED DESCRIPTION

Figure 1:
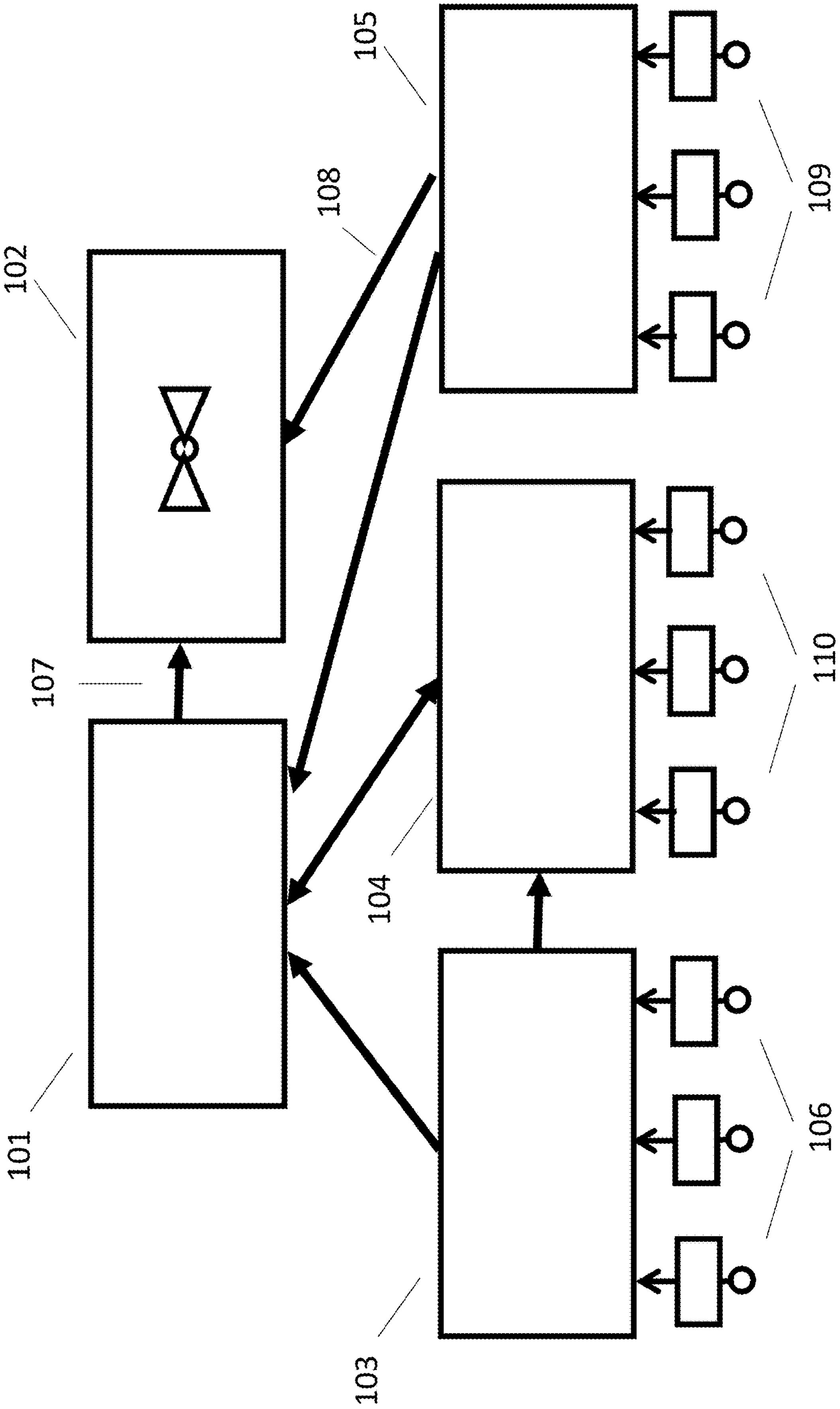
FIG. 1 shows the structure of a control system according to the invention.

FIG. 1 shows the distributed structure of the control system for controlling a technical system, in particular for the safe control of the technical system. The arrows in FIG. 1 illustrate communication channels for the time-controlled transport of messages.

The control system consists of four independent computer subsystems, the primary control system, PCS, 103, the monitoring system, MS, 104, the fallback system, FBS, 105 and the decision system, DS, 101.

Under normal conditions, the PCS 103 uses its sensor system 106 to calculate new setpoint values for the system to be controlled in each time slice. These setpoint values are transferred to the DS 101 and the MS 104.

The FBS 105 uses its sensor system 109 to calculate new setpoint values in each time slice, which can bring the system from the present state to a safe state, and sends these setpoint values to the DS 101 and to an input channel 108 of an intelligent actuator 102, the so-called second input channel 108.

Using its sensor system 110, the MS 104 builds an independent model of the system and its environment and then checks whether the setpoint values calculated by the PCS 103 using its sensor system 106 in this environment modelled by the MS 104 will ensure a safe behaviour of the system. If this is the case, the value TRUE is reported to the DS 101. If this is not the case, the value FALSE is reported to the DS 101.

In each time slice, the DS 101 receives one periodic time-controlled message from the PCS 103, the MS 104 and the FBS 105. If the MS 104 has reported the value TRUE, the DS 101 forwards the setpoint values received from the PCS 103 in a time-controlled message to the IA 102. If the MS 104 has reported the value FALSE, then the DS 101 forwards the setpoint values received from the FBS 105 to the intelligent IA 102. The IA 102 has an additional input channel 107, which is independent of the second input channel 108, the so-called first input channel 107, via which the DS 101 sends the selected setpoint values to the IA 102.

In the fault-free case, the IA 102 first receives a message from the FBS 105 at an a priori known (so-called second) time point (timepoint_2 221 in FIG. 2) and later, at an a priori known (so-called first) time point (timepoint_1 222 in FIG. 2), a message from the DS 101. Chronologically, the first time point 222 occurs after the second time point 221. If no message has been received from the DS 101 by the intelligent actuator 102 by timepoint_1 222 (because the DS 101 has failed due to a fail-silent fault), the IA 102 then takes the setpoint values contained in the message received from the FBS 105 at timepoint_2 221. In the following time slices, the intelligent IA 102 takes the setpoint values received from the FBS 105 until the system enters a safe state and the control system is reinitialized.

Figure 2:
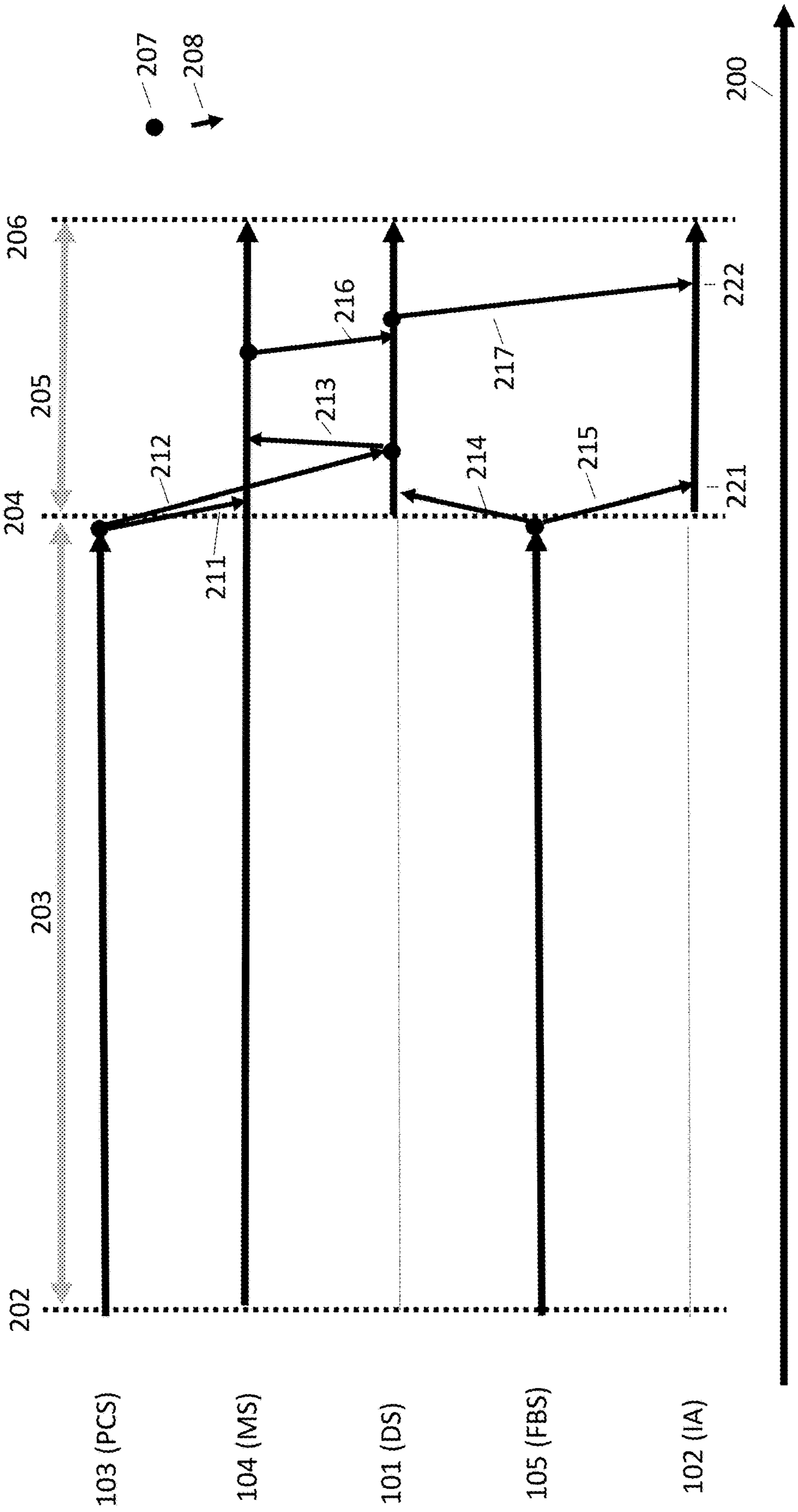
FIG. 2 shows the communication of the subsystems of the control system within a time slice.

FIG. 2 shows the temporal progression of the message transmissions within a time slice. Increasing time is sketched on the abscissa 200. Points 207 mark the sending times (ST) of messages and arrow heads 208 mark the reception time (ET) of a message in each case.

From a temporal point of view, a time slice is divided into two successive phases, the calculation phase 203 with the start point 202 and the end point 204, and the following verification phase 205 with the start point 204 and end point 206. The PCS 103, the FBS 105 and the MS 104 are active in the calculation phase 203. The MS 104, the DS 101 and the IA 102 are active in the verification phase 205.

Advantageously, the MS 104 consists of two subsystems, a calculation system and a verification system, wherein the totality of these two subsystems forms a single fault-containment unit. It is then possible that while the verification system of the MS 104 performs the verification of the setpoint values in the verification phase 205 of the current time slice, the calculation system of the MS 104 simultaneously performs the calculation of the environmental model in the calculation phase 203 of the following time slice.

After the start of the calculation phase 203 of each time slice, the PCS 103 and the FBS 105 read their sensors, build a model of the system and the environment, and calculate new setpoint values. With its sensor data, the MS 104 builds a model of the system and the environment, in order to then be able to check the correctness of the setpoint values of the PCS 103 in relation to this independently developed model in the verification phase 205.

At the end of the calculation phase 203 (or before the end of the calculation phase 203, as soon as the calculations are completed), the PCS 103 sends a message 211 with the calculated setpoint values to the MS 104 and a message 212 with the calculated setpoint values to the DS 101.

At the end of the calculation phase 203 (or before the end of the calculation phase 203, as soon as the calculations are completed), the FBS 105 sends a message 214 with the calculated setpoint values to the MS 104 and a message 215 with the calculated setpoint values to the second input channel 108 of the IA 102, where the message arrives at the second time point 221.

The verification phase begins at time point 204. Preferably, the DS 101 first sends the setpoint values received by the PCS 103 in a message 213 to the MS 104, so that a Byzantine fault of the PCS 103 can be detected. In the event that the content of the message 213 differs from the content of the message 211, there is a Byzantine fault present in the PCS 103. In this case, the MS 104 sets the content of a message 216 that the MS 104 sends to the DS 101 to FALSE. In the event that the content of the message 216 is FALSE, the message that the DS 101 sends to the first input channel 107 of the IA 102 contains the setpoint values, which the DS 101 received from the FBS 105, as selected setpoint values.

If no Byzantine fault was detected, in the time interval between the ET of message 211 from the PCS 103 in the MS 104 and the ST of a message 216, which the MS 104 sends to the DS 101, the MS 104 checks on the basis of its model (which was calculated in the calculation phase 203 with the sensor system 110 of the MS 104), whether the setpoint values received from the PCS 103 ensure a safe behaviour of the system in this environment. If this is the case, the MS 104 sends the value TRUE to the DS 101 in a message 216, otherwise it sends the value FALSE.

In the time interval between the ET of message 216 in the DS 101 and the ST of a message 217, which the DS 101 sends to the IA 102, the DS 101 decides as follows: if the value in the message 216 is TRUE (and there is no Byzantine fault in the PCS 103), for example, the DS 101 sends the setpoint values received from the PCS 103 in message 212 to the first input channel 107 of the IA 102 in the message 217, where the message arrives at the first timepoint_1 222, otherwise, the DS 101 sends the setpoint values received from the FBS 105 in message 214 to the first input channel 107 of the IA 102 in message 217, where the message arrives at the first timepoint_1 222.

With the (first) decision of the DS 101 to send the setpoint values from the FBS 105 to the intelligent actuator 102, the situation of DS 101 changes from normal to abnormal. This change is recorded in a situation variable of the DS 101. As long as this situation variable contains the value abnormal, the DS 101 sends the setpoint values from the FBS 105 contained in the message 214 to the IA 102. After reinitializing the control system or the DS 101, the value of the situation variable is reset from abnormal to normal.

Immediately after the a priori known reception time (ET) 222 of the message 217, the IA 102 checks whether a message 217 was received from the DS 101 in the current time slice. If this is the case, the setpoint values of this message 217 are applied. Otherwise (in the event of a fail-silent fault in the DS 101), the setpoint values from the message 215 from the FBS 105 are used.

With the decision of the IA 102 to use the setpoint values directly from the FBS 105, the situation of the IA 102 changes from normal to abnormal. This change is recorded in a situation variable of the IA 102. After reinitializing the control system or the IA 102, the value of the situation variable is reset from abnormal to normal.

Since in the disclosed control system the described messages preferably have a state semantics, two or more copies of a message can also be sent in the time interval (sending time of a data transmission, reception time of a data transmission) in order to tolerate the loss of one or more messages.

Since the development and construction of a fail-silent system requires less effort than the development and construction of a fault-tolerant system which must always function, the invention is of great economic importance.

That which is claimed is:

1. A control system for the safe control of a technical system, wherein the control system comprises:

four mutually independent computer subsystems, a primary control system, PCS, (103), a monitoring system, MS, (104), a fallback system, FBS, (105) and a decision system, DS, (101), wherein the PCS (103) calculates setpoint values for the control of the technical system in each time slice and sends the setpoint values in a message (211) to the MS (104) and the DS (101) before the end of the time slice in each case, wherein the MS (104) checks the setpoint values it has received from the PCS (103) in each time slice, and transmits the result of this check—TRUE or FALSE—before the end of the time slice in a message (216) to the DS (101), wherein the FBS (105) calculates setpoint values in each time slice that can bring the system from a present state to a safe state, and wherein the FBS (105) sends these setpoint values in a message to the DS (101), wherein the DS (101) receives one message each from the PCS (103), the MS (104) and the FBS (105) in each time slice and, on the basis of the result of the check by the MS (104), decides whether the setpoint values of the PCS (103) or the FBS (105) are sent to the actuators (102) as selected setpoint values, wherein the actuators (102) are intelligent actuators, IA, which have a first input channel (107) and a second input channel (108), wherein if the DS (101) is fault-free, the DS (101) sends the selected setpoint values to the first input channel (107) of the IA (102) in a time-controlled message (217) at an a priori determined periodic first time point (222) in each time slice, wherein the DS (101) has a fail-silent behaviour, so that if a fault occurs in the DS (101), no message is sent to the IA (102), wherein the FBS (105) is configured to send its calculated setpoint values in a time-controlled message (215) to the second input channel (108) of the IA (102) in each time slice at an a priori determined periodic second timepoint_2 (221), wherein in each time slice the second timepoint_2 (221) occurs before the first timepoint_1 (222), wherein after the first timepoint_1 (222), the IA (102) checks whether the IA (102) has received a message sent by the DS (101) in the present time slice, wherein if this is the case, the IA (102) directs the selected setpoint values contained in the message (217) sent by the DS (101) and received by the IA (102) to the system, and wherein if this is not the case, the IA (102) directs the setpoint values contained in the message (215) sent by the FBS (105) to the second input channel (108) of the IA (102) to the system, and the IA (102) continues to transmit the setpoint values received from the FBS (105) via the second input channel (108) to the system in all subsequent time slices until the control system is reinitialized.

2. The control system according to claim 1, wherein the MS (104) generates a model of the system and its environment and on the basis of this model checks whether the setpoint values received from the PCS (103) ensure a safe behaviour of the system, and if safe behaviour is ensured, as a result of checking, sends the value TRUE in the message (216) to the DS (101) and otherwise sends the value FALSE.

3. The control system according to claim 1, wherein the control system is reinitialized after the system has reached a safe state.

4. The control system according to claim 1, wherein the MS (104) consists of two subsystems, a calculation system and a verification system, wherein the totality of these two subsystems forms a single fault-containment unit.

5. The control system according to claim 1, wherein in the MS (104), the calculation phase of the subsequent time slice is carried out in parallel with the verification phase of the present time slice.

6. The control system according to claim 1, wherein, if the message (216) from the MS (104) to the DS (101) contains the value FALSE, if the DS (101) is fault-free, in its message to the first input channel (107) of the IA (102), the DS (101) transmits the setpoint values received from the FBS (105) as selected setpoint values, and wherein the DS (101) continues to send the setpoint values of the FBS (105) to the first input channel (107) of the IA (102) in all subsequent time slices, until the control system or the DS (101) is reinitialized.

7. The control system according to claim 1, wherein in a time slice, the MS (104) receives the setpoint values calculated by the PCS (103) in a message (211), further receives in a message (213) from the DS (101) the setpoint values sent by the PCS (103) in a message (212) to the DS (101), and the MS (104) sends a message (216) to the DS (101), the content of which is set to FALSE if the content of the message (213) from the DS (101) differs from the content of the message (211) from the PCS (103).

8. The control system according to claim 1, wherein the DS (101) comprises a simple software and a fault-detecting processor on which the simple software for calculating the setpoint values is executed.

9. A method for the safe control of a technical system with a control system, wherein the control system comprises four mutually independent computer subsystems, a primary control system, PCS, (103), a monitoring system, MS, (104), a fallback system, FBS, (105) and a decision system, DS, (101), the method comprising:

calculating, by the PCS (103), setpoint values for the control of the technical system in each time slice and sends the setpoint values in a message (211) to the MS (104) and the DS (101) before the end of the time slice in each case, checking, by the MS (104), the setpoint values it has received from the PCS (103) in each time slice, and transmits the result of this check—TRUE or FALSE—before the end of the time slice in a message (216) to the DS (101), calculating, by the FBS (105), setpoint values in each time slice that can bring the system from a present state to a safe state, and wherein the FBS (105) sends these setpoint values in a message to the DS (101), receiving, by the DS (101), one message each from the PCS (103), the MS (104) and the FBS (105) in each time slice and, on the basis of the result of the check by the MS (104), decides whether the setpoint values of the PCS (103) or the FBS (105) are sent to the actuators (102) as selected setpoint values, wherein the actuators (102) are intelligent actuators, IA, which have a first input channel (107) and a second input channel (108), wherein if the DS (101) is fault-free, the DS (101) sends the selected setpoint values to the first input channel (107) of the IA (102) in a time-controlled message (217) at an a priori determined periodic first time point (222) in each time slice, wherein the DS (101) has a fail-silent behaviour, so that if a fault occurs in the DS (101) no message is sent to the IA (102), wherein the FBS (105) is configured to send, in each time slice, its calculated setpoint values in a time-controlled message (215) to the second input channel (108) of the IA (102) at an a priori determined periodic second timepoint_2 (221), wherein in each time slice the second timepoint_2 (221) occurs before the first timepoint_1 (222), wherein after the first timepoint_1 (222), the IA (102) checks whether the IA (102) has received a message sent by the DS (101) in the present time slice, wherein if this is the case, the IA (102) directs the selected setpoint values contained in the message (217) sent by the DS (101) and received by the IA (102) to the system, and wherein if this is not the case, the IA (102) directs the setpoint values contained in the message (215) sent by the FBS (105) to the second input channel (108) of the IA (102) to the system, and the IA (102) continues to transmit the setpoint values received from the FBS (105) via the second input channel (108) to the system in all subsequent time slices until the control system is reinitialized.

10. The method according to claim 9, wherein the MS (104) generates a model of the system and its environment and on the basis of this model checks whether the setpoint values received from the PCS (103) ensure a safe behaviour of the system, and if safe behaviour is ensured, as a result of checking, sends the value TRUE to the DS (101) and otherwise sends the value FALSE in the message (216).

11. The method according to claim 9, wherein the control system is reinitialized after the system has reached a safe state.

12. The method according to claim 9, wherein the MS (104) consists of two subsystems, a calculation system and a verification system, wherein the totality of these two subsystems forms a single fault-containment unit.

13. The method according to claim 9, wherein in the MS (104), the calculation phase of the subsequent time slice is carried out in parallel with the verification phase of the current time slice.

14. The method according to claim 9, wherein, if the message (216) of the MS (104) to the DS (101) contains the value FALSE, if the DS (101) is fault-free, in its message to the first input channel (107) of the IA (102), the DS (101) transmits the setpoint values received from the FBS (105) as selected setpoint values, and wherein the DS (101) continues to send the setpoint values of the FBS (105) to the first input channel (107) of the IA (102) in all subsequent time slices, until the control system or the DS (101) is reinitialized.

15. The method according to claim 9, wherein in a time slice, the MS (104) receives the setpoint values calculated by the PCS (103) in a message (211), further receives in a message (213) from the DS (101) the setpoint values sent by the PCS (103) in a message (212) to the DS (101), and the MS (104) sends a message (216) to the DS (101), the content of which is set to FALSE if the content of the message (213) from the DS (101) differs from the content of the message (211) from the PCS (103).

* * * * *